United States Patent [19]
Fantino et al.

[11] Patent Number: 6,036,904
[45] Date of Patent: Mar. 14, 2000

[54] METHOD OF MANUFACTURING A CONNECTING ROD MADE FROM COMPOSITE MATERIAL

[75] Inventors: Lucien Fantino, Merignac; Georges Cahuzac, Le Bouscat, both of France

[73] Assignee: Aerospatiale Societe Nationale Industrielle, Paris, France

[21] Appl. No.: 09/063,605

[22] Filed: Apr. 21, 1998

Related U.S. Application Data

[62] Division of application No. 08/720,213, Sep. 26, 1996, which is a continuation of application No. 08/412,745, Mar. 29, 1995, abandoned.

[30] Foreign Application Priority Data

Apr. 18, 1994 [FR] France .................................. 94 04585

[51] Int. Cl.⁷ ...................................................... B32B 31/18
[52] U.S. Cl. ........................ 264/138; 264/102; 264/162; 264/258; 264/510
[58] Field of Search .................................. 264/137, 157, 264/159, 160, 258, 153, 162, 510, 102, 138; 156/93, 251, 256

[56] References Cited

U.S. PATENT DOCUMENTS

| | | | |
|---|---|---|---|
| 1,337,993 | 4/1920 | Bird .......................................... | 156/93 |
| 2,119,479 | 5/1938 | Bacon ..................................... | 264/258 |
| 2,594,838 | 4/1952 | Alexander et al. ..................... | 264/137 |
| 3,072,958 | 1/1963 | Collins .................................... | 264/160 |
| 4,031,181 | 6/1977 | Schaefer et al. ........................ | 264/137 |
| 4,268,560 | 5/1981 | Maistre ................................... | 428/107 |
| 4,350,056 | 9/1982 | Ban et al. ............................... | 74/579 E |
| 4,376,749 | 3/1983 | Woelfel ................................... | 264/137 |
| 4,408,380 | 10/1983 | Schaper et al. ........................ | 74/579 E |
| 4,416,929 | 11/1983 | Kruger .................................... | 428/102 |
| 4,427,482 | 1/1984 | Yamada et al. ......................... | 264/137 |
| 4,458,555 | 7/1984 | Holtzberg et al. ..................... | 74/579 E |
| 4,786,541 | 11/1988 | Nishimura et al. ..................... | 428/102 |
| 5,033,514 | 7/1991 | Just et al. ............................... | 139/145 |
| 5,156,396 | 10/1992 | Akatsuka et al. ...................... | 273/80 B |
| 5,217,766 | 6/1993 | Flonc et al. ............................. | 264/258 |
| 5,389,323 | 2/1995 | Cook ....................................... | 264/160 |
| 5,428,896 | 7/1995 | Auberon et al. ....................... | 29/888.09 |
| 5,429,853 | 7/1995 | Darrieux ................................. | 156/93 |
| 5,664,518 | 9/1997 | Lewit et al. ............................. | 264/258 |
| 5,827,392 | 10/1998 | Buckley et al. ........................ | 264/258 |

*Primary Examiner*—Jan H. Silbaugh
*Assistant Examiner*—Stefan Staicovici
*Attorney, Agent, or Firm*—Marshall, O'Toole, Gerstein, Murray & Borun

[57] ABSTRACT

A method of making a connecting rod made of composite material, especially for internal-combustion engines, the composite material being formed by a reinforcement embedded in a cured material, and the connecting rod (A) comprising, along the longitudinal extension (X-X) of the connecting rod, a central shank (B) extended respectively, at its two ends, by a connecting-rod big end (C) and a connecting-rod small end (D). The connecting rod (A) is produced entirely as a single component made of composite material and the reinforcement of the composite material comprises superposed plies of crossed straight filling yarns, the filling yarns, which extend parallel to the longitudinal extension (X-X) of the connecting rod (A), constituting at least twice the volume percentage of the filling yarns which extend in each of the directions other than the longitudinal extension (X-X) of the connecting rod (A), and binding yarns which pass through the superposed plies.

5 Claims, 3 Drawing Sheets

METHOD OF MANUFACTURING A CONNECTING ROD MADE FROM COMPOSITE MATERIAL

This is a divisional of U.S. Ser. No. 08/720,213 filed Sep. 26, 1996, which is a continuation of U.S. Ser. No. 08/412,745 filed Mar. 29, 1995, now abandoned.

BACKGROUND OF THE INVENTION

The present invention relates to a connecting rod made of composite material, especially for—internal-combustion engines, as well as to a method for manufacturing such a connecting rod.

Such a connecting rod is an elongate component which includes, in addition to a central shank, a wider big end, which is the part of the connecting rod lying on the crankshaft side, and a narrower small end, which is the part of the connecting rod lying on the piston side. In order to mount it, the big end must be able to open, and it therefore includes two elements fastened by two bolts which exert a significant stress on that surface of the element against which they are tightened. The connecting rod is a component which has a preferential direction of loading and has to have a high stiffness preventing deformations around the bores of the small end and the big end.

A connecting rod made of composite material is already known, for example from Patent FR-A-2,654,483. By composite material is meant a material which includes a reinforcement of yarns or fibers, this reinforcement being embedded in a matrix of cured synthetic material. Such a composite material, in addition to the weight saving that it provides, withstands mechanical loads extremely well, has a high corrosion resistance and excellent high-temperature behavior. However, in Patent FR-A-2,654,483, these properties of composite materials are not fully exploited on account of the fact that, in this case, the shank, small end and big end of the connecting rod are produced in the form of separate components connected by adhesive bonding and winding of a yarn, forming a strap. Furthermore, such a production is complicated and has to be implemented in several steps, thereby preventing effective mass production of such connecting rods.

SUMMARY OF THE INVENTION

The object of the present invention is to avoid these drawbacks and relates to a connecting rod made of composite material, the structure of which makes it possible, on the one hand, to fully exploit the properties of the composite materials and, on the other hand, to manufacture a large number of such components easily and quickly.

For this purpose, the connecting rod made of composite material, especially for internal-combustion engines, said composite material being formed by a reinforcement embedded in a cured material, and said connecting rod comprising, along the longitudinal extension of the connecting rod, a central shank extended respectively, at its two extremities, by a connecting-rod big end and a connecting-rod small end, is noteworthy in that, according to the invention, said connecting rod is produced entirely as a single component made of composite material, in that the reinforcement of said composite material comprises superposed plies of crossed straight filling yarns, the filling yarns, which extend parallel to the longitudinal extension of the connecting rod, constituting at least twice the volume percentage of the filling yarns which extend in each of the directions other than the longitudinal extension of the connecting rod and in that binding yarns pass through said superposed plies.

Thus, the reinforcement of the connecting rod made of composite material according to the invention has an increased strength in the maximum load direction, that is to say the longitudinal extension of the connecting rod, and, in addition, since the connecting rod is made of a single component of composite material, it is simple to manufacture and the properties of the composite material may be exploited to the maximum.

Advantageously, assuming that the filling yarns of the reinforcement extending parallel to the longitudinal extension of the connecting rod are the 0° direction yarns, the other filling yarns of the reinforcement extend along the 45°, 90° and 135° directions.

In particular, the reinforcement may comprise as many 0° direction filling yarns as there are filling yarns extending along the other three, 45°, 90° and 135°, directions.

Preferably, with respect to the total volume of the composite material including the reinforcement and the cured matrix, the volume percentage of the filling yarns is between 40% and 60% and the volume percentage of the binding yarns is between 1% and 10%.

In particular, the volume percentage of the 0° direction filling yarns is at least substantially equal to 27%, while the volume percentage of the 45°, 90° and 135° direction filling yarns is at least substantially equal, in each case, to 9%.

Moreover, the volume percentage of the binding yarns may be at least substantially equal to 3%.

Advantageously, for each series of plies, the filling yarns are arranged in the following sequence: 0° direction yarns, 45° direction yarns, 0° direction yarns, 90° direction yarns, 0° direction yarns and 135° direction yarns.

According to another characteristic of the invention, additional 90° direction filling yarns are provided in the region of the connecting-rod big end, increasing its thickness.

Preferably, said additional 90° direction filling yarns are incorporated in each of said series of plies.

According to yet other characteristics of the invention, 0° direction filling yarns, going around the connecting-rod small end, may be incorporated between said series of plies, and/or yarns, going around the connecting-rod small end, may be arranged by stitching along the edges of said connecting-rod small end.

The present invention also relates to a method for manufacturing a connecting rod made of composite material, which has just been described, noteworthy in that, according to the invention:

a) a reinforcement for a sheet of composite material is produced, said reinforcement comprising superposed plies of crossed straight filling yarns, the filling yarns, which extend parallel to a first direction, constituting at least twice the volume percentage of the filling yarns which extend in each of the other directions, and binding yarns passing through said superposed plies;

b) said reinforcement is impregnated with a synthetic material intended to form the matrix of said sheet of composite material;

c) said synthetic resin is cured so as to form said sheet of composite material;

d) said sheet of composite material is cut so as to obtain connecting-rod preforms, said first direction corresponding to the longitudinal extension of said preforms; and e) each connecting-rod preform thus obtained is machined into its final state.

In particular, assuming that the filling yarns of the reinforcement extending along said first direction are the 0° direction yarns, the other filling yarns of the reinforcement extend along the 45°, 90° and 135° directions.

Preferably, in step a), as many 0° direction filling yarns are laid down as there are filling yarns extending along the other three, 45°, 90° and 135° directions.

Advantageously, for each series of plies, the filling yarns are laid down according to the following sequence: 0° direction yarns, 45° direction yarns, 0° direction yarns, 90° direction yarns, 0° direction yarns and 135° direction yarns.

According to another characteristic of the invention, in step a), additional 90° direction filling yarns are laid down in the region corresponding to the connecting-rod big ends.

Preferably, in this case, said additional 90° direction filling yarns are laid down at the time of production of each of said series of plies.

According to yet another characteristic of the invention, between said series of plies, 0° direction filling yarns, going around the places provided for the connecting-rod small ends, are laid down.

In particular, step d) may be carried out before steps b) and c) in order thus to make it possible, after step d), to stitch yarns into the reinforcement, going around the connecting-rod small end, along the edges of the latter.

DESCRIPTION OF THE DRAWINGS

The figures of the appended drawing will make it well understood how the invention may be realized. In these figures, identical references designate similar elements.

DETAILED DESCRIPTION OF THE PREFERRED EMBODIMENT

Figure 2:
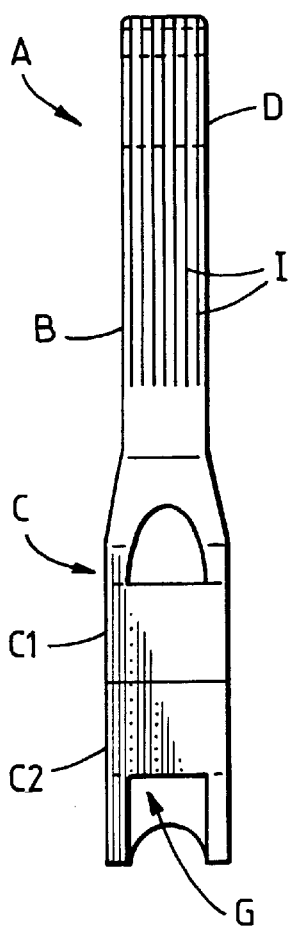
FIG. 2 is a side view of FIG. 1.
Figure 1:
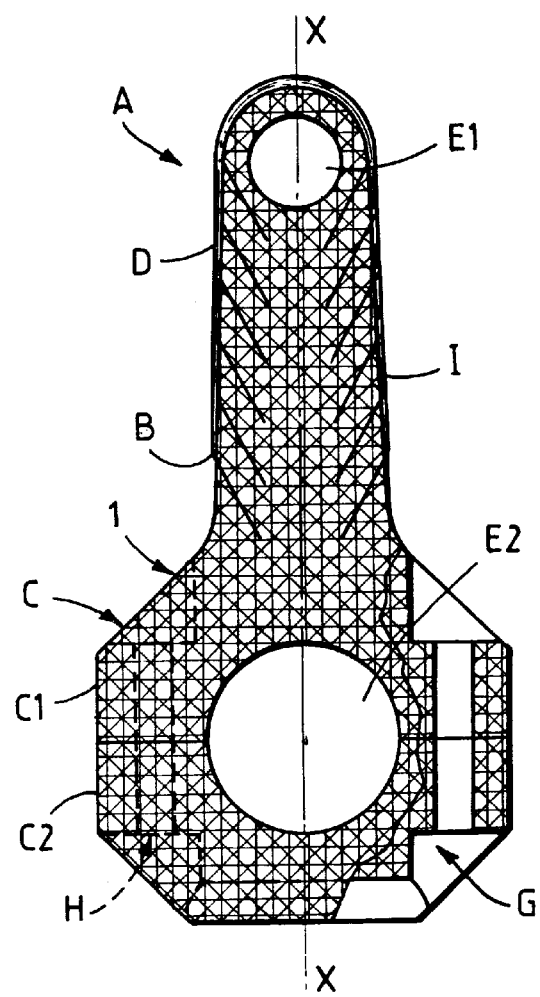
FIG. 1 is a front view of a connecting rod produced according to the invention.

FIGS. 1 and 2 show a connecting rod A made of composite material, according to the invention, especially for internal-combustion engines. As already indicated, the composite material in question is formed by a reinforcement of yarns (especially carbon, glass or boron yarns) which is embedded in a matrix of cured synthetic material. It will be noted that, for reasons of illustration, the network of yarns of the reinforcement is shown diagrammatically in FIGS. 1 and 2, this network obviously not being visible as clearly when the reinforcement is embedded in the matrix.

Conventionally, the connecting rod A comprises, along its longitudinal extension X-X, a central body B respectively extended, at its two extremities, by a connecting-rod big end C and a connecting-rod small end D, each including a bore E1, E2 for connecting the connecting rod, on the one hand, to the crankshaft and, on the other hand, to the piston. In order to mount it, the connecting-rod big end C must be able to open and therefore includes two elements C1, C2 fastened by bolts (not depicted) and having, for this, internal threads G, H. As already indicated, such a connecting rod is a component having a preferential load direction (its longitudinal extension X-X), and must have high stiffness preventing deformations around the bores of the small end and the big end.

Figure 5A:
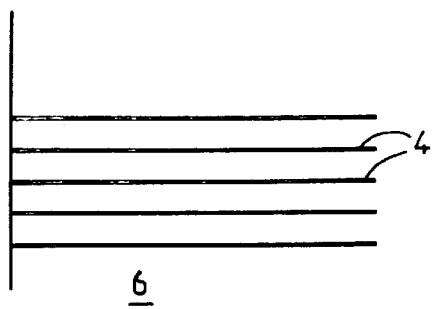
FIGS. 5A–5F illustrate the various phases in the formation of a series of plies of yarns according to the invention.
Figure 5D:
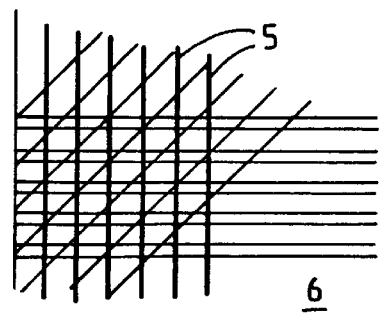
Figure 5B:
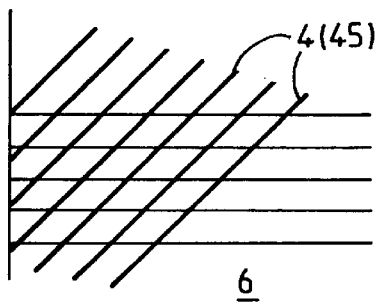
Figure 5E:
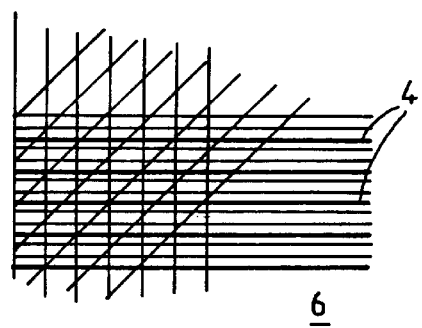
Figure 5C:
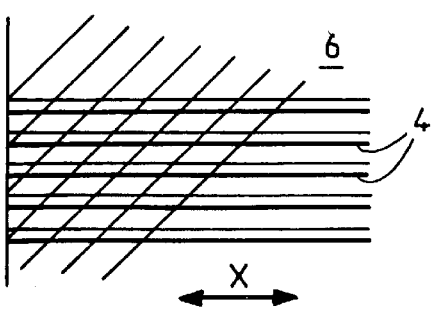
Figure 5F:
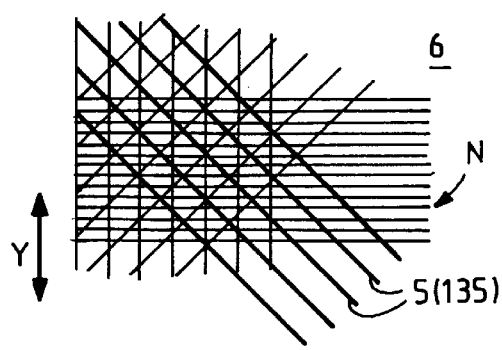
Figure 6:
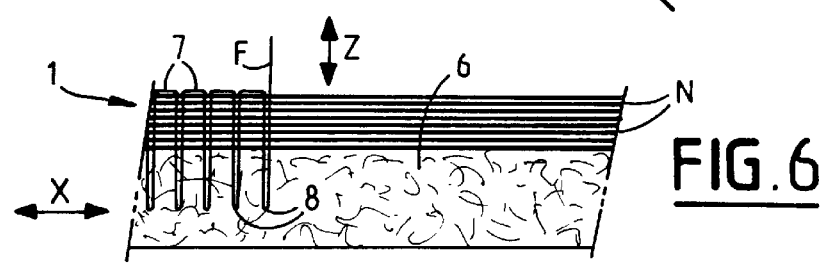
FIG. 6 shows the stitching of the superposed plies.

According to the invention, the connecting rod A is produced entirely as a single component made of composite material and the reinforcement 1 of the composite material comprises superposed plies of crossed straight filling yarns, the filling yarns, which extend parallel to the longitudinal extension X-X of the connecting rod A, constituting at least twice the volume percentage of the filling yarns which extend in each of the directions other than the longitudinal extension X-X of the connecting rod and, moreover, binding yarns F passing through said superposed plies, forming stitches 7 having open loops 8 (FIG. 6) using a needle, not depicted in FIG. 6. The production of a series of plies N will be described in detail hereinbelow with regard to FIGS. 5A–5F. By series of plies is meant a repeated succession of plies, as explained hereinafter.

With respect to the total volume of the composite material, including the reinforcement and the cured matrix, the volume percentage of the filling yarns is between 40% and 60% and the volume percentage of the binding yarns is between 1% and 10%. For example, assuming that the filling yarns of the reinforcement extending parallel to the longitudinal extension of the connecting rod are the 0° direction yarns and that the other filling yarns of the reinforcement extend along the 45°, 90° and 135° directions, the reinforcement comprises as many 0° direction filling yarns as there are filling yarns extending along the other three, 45°, 90° and 135°, directions.

By way of example, the volume percentage of the 0° direction filling yarns is at least substantially equal to 27%, while the volume percentage of the 45°, 90° and 135° direction filling yarns is at least substantially equal, in each case, to 9%. As regards the volume percentage of the binding yarns, this may be at least substantially equal to 3%.

In order to manufacture the connecting rod A made of composite material according to the invention, the procedure is generally carried out in the following way:

a) a reinforcement is produced for a sheet of composite material, said reinforcement comprising superposed plies of crossed straight filling yarns, the filling yarns, which extend parallel to a first direction, constituting at least twice the volume percentage of the filling yarns which extend in each of the other directions, and binding yarns passing through said superposed plies;

b) said reinforcement is impregnated with a synthetic material intended to form the matrix of said sheet of composite material;

c) said synthetic resin is cured so as to form said sheet of composite material;

d) said sheet of composite material is cut so as to obtain connecting-rod preforms, said first direction corresponding to the longitudinal extension of said preforms; and e) each connecting-rod preform thus obtained is machined into its final state.

Figure 4:
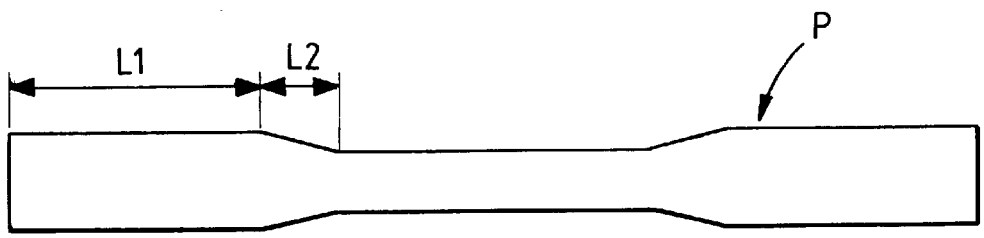
FIG. 4 is the IV—IV cross section of FIG. 3.
Figure 3:
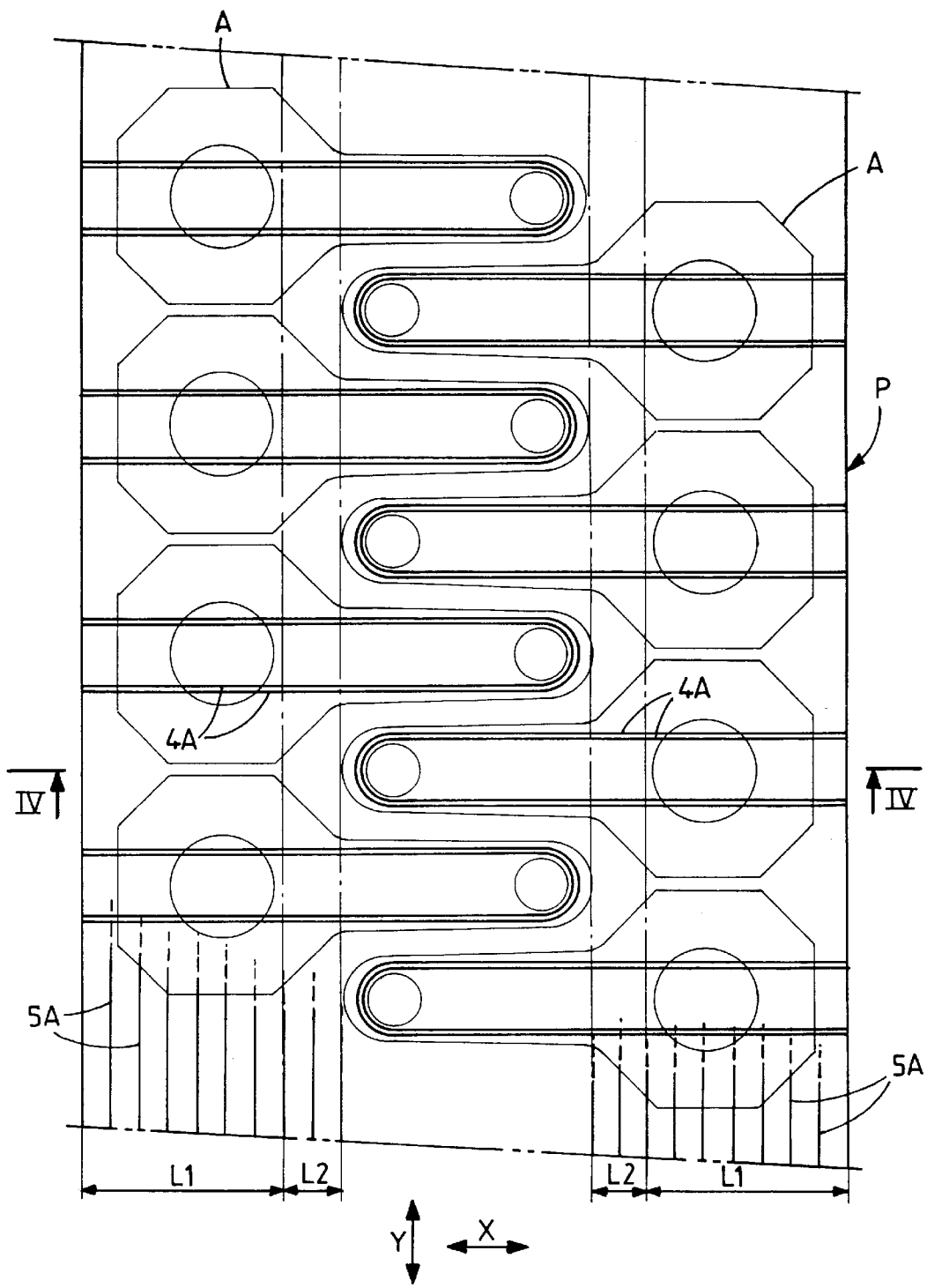
FIG. 3 is a view from above of a sheet from which the connecting rods of the invention are cut out.

FIGS. 3 and 4 show such a sheet P from which connecting rods A according to the invention will be cut out. It may be seen, especially in FIG. 3, that the shape of the connecting rods and the formation of a sheet of simple geometrical shape make it possible to manufacture, simply, a large number of connecting rods with a minimum of scrap.

FIGS. 5A–5F illustrate various phases in the formation of a series of plies N of yarns according to the invention. In this example, for each series of plies, the filling yarns are laid down in the following sequence: 0° direction yarns 4 (FIG. 5A), 45° direction yarns 4 (45) (FIG. 5B), 0° direction yarns 4 (FIG. 5C), 90° direction yarns 5 (FIG. 5D), 0° direction yarns 4 (FIG. 5E) and 135° direction yarns 5 (135) (FIG. 5F). The filling yarns are laid down or a support 6, assuming that the series of plies in question, for reasons of clarity of the drawing, is the first series of plies that is laid down. The above yarns may be laid down in any known manner, but advantageously as described in the French patent applications, filed on Apr. 18, 1994, in the name of the Applicant Company for "Method and machine for the production of a reinforcement for a component of composite material" and "Method and machine for the production of a reinforcement in the form of a sheet for a component of composite material".

It will be noted that the thickness of a series of plies, that is to say the thickness of the layer constituted by the filling yarns inserted in the various directions defined hereinabove, depends on the laydown spacing of the yarns and on the cross section of the yarns. By way of practical example, this thickness is approximately 1 mm and such series of plies will be superposed as many times as necessary depending on the thickness of the component to be obtained.

Moreover, in order to increase the thickness of the connecting rod in the regions L1 (FIG. 3) corresponding to the connecting-rod big ends, additional 90° direction filling yarns 5A are laid down, when making up each series of plies, in said regions as well as in the transition regions L2. This makes it possible to obtain directly, at the cutting-out stage, a component having a variable thickness, avoiding having to machine the component faces in order to achieve this.

In addition, between two successive series of plies, it is possible to lay down 0° direction filling yarns 4A going around the places provided for the connecting-rod small ends (FIG. 3).

This may be carried out by yarn-guiding pins in the support which are removed during the stitching operation (laydown of the binding yarns).

It is also possible, after cutting the sheet into elementary components and before impregnating with the matrix, to strengthen the connecting-rod small end with yarns I stitched into the reinforcement, going around the connecting-rod small end D, along the edges of the latter (FIGS. 1 and 2).

For implementing the method which has just been described, it is possible to use a programmable machine, particular embodiments of which are described in the French patent applications mentioned hereinabove.

For the plies whose yarns have simple straight paths, the machine operator uses the callup, by means of a main program, of these directions.

A first program creates the data necessary for simple ply filling in accordance with a tool. The operator inputs into this program the tool data: length, width, spacing of the peripheral pins.

This program creates, on a floppy disk:
 four files for the 0° direction,
 four files for the 90° direction,
 two files for the 45° direction,
 two files for the 135° direction.

In fact, the 0° and 90° direction plies may be produced by starting from one of the four corners of the tool, whereas the 45° and 135° direction plies can only start from two opposite corners.

For a particular component, the operator creates a program which successively calls up the various plies to be inserted, satisfying the concatenation of starting and finishing points.

Moreover, one particular program will create the files corresponding to the laydown of plies of yarns in directions other than those mentioned hereinabove.

The paths of particular yarns are generally sufficiently simple to be programmed by the operator, by a teaching process, these then being called up by the main program.

The stitching function is called up by the stitching program. During the execution of each stitch, the length of yarn used is measured and compared to the required length written into the stitching program.

In order to produce the sheet, after having placed the desired filling frame on the machine, the operator inserts the floppy disk corresponding to the frame used into the machine's floppy-disk reader, and calls up the main program defining this sheet.

He inserts the yarns into the laydown tool and adhesively bonds their extremities to the frame with an adhesive tape.

The filling is performed automatically and requires the intervention of the operator:
 only after executing a pattern of six plies (a series of plies) in the case of use of a frame with straight peripheral pins, this requiring the yarns to be packed onto these pins,
 or in the event of the machine detecting the absence of yarn (empty bobbin).

At the end of filling, the operator also adhesively bonds the extremities of the yarns to the frame.

The stitching is performed after having placed, on the face opposite the stitching tool, a soft material capable of allowing the extremity of the needle to pass through. This stitching may be performed on one face and then the sheet may be turned over in order to be stitched on the second face. The stitches may be produced so as to be located at the most judicious places for the strength of the component, in particular the two sides of the holes of the bolts connecting the connecting-rod big end to the shank.

Each component may be cut out from the sheet before impregnation. This is essential in order to be able to arrange yarns I going around the small end, by stitching along the side faces (edges). This cutting-out is performed by sawing or by using a water-jet machine.

These components are impregnated according to the cycle:
 putting the component in a mold,
 evacuating the mold,
 injecting the resin,
 raising the temperature, holding the pressure until the resin has set,
 demolding the preform, and
 postcuring in an oven, outside the mold.

The machining is identical to that of any mechanical component. In general, it is performed with diamond grinding wheels. In the case where the component is produced from a sheet with the thickness variations provided during filling and the impregnation is performed in a mold to the desired dimensions, machining may be reduced to separating the big end into two elements, and to drilling the holes and cutting the internal threads for the fixing bolts.

What is claimed is:

1. A method for manufacturing an elongated connecting rod made of composite material and having a central body (3) respectively extended at its two extremities by a connecting-rod big end (C) and a connecting-rod small end (D), the method comprising the steps of:
 a) producing a reinforcement sheet (P) comprising superposed plies of crossed straight filling yarns, some of said filling yarns extending parallel to a first direction and some of said filling yarns extending parallel to other directions, the filling yarns extending parallel to the first direction constituting at least twice the volume percentage of the filling yarns extending in each of said other directions, and binding yarns passing through said superposed plies, said reinforcement sheet (P) having:

- at least one thickened region (L1) obtained by laying down additional filling yarns (5A) when making said superposed plies, and
- additional filling yarns (4A) of said first direction going around said connecting-rod small end (D), said additional filling yarns (4A) being laid down when said superposed plies are made;

b) cutting out at least one connecting-rod preform from said reinforcement sheet (P), the longitudinal extension (X-X) of said preform corresponding to said first direction and at least one connecting-rod end (C, D) of said preform corresponding to said at least one thickened region (L1);

c) stitching strengthening yarns (I) into said preform, said strengthening yarns (I) going around said connecting-rod small end (D);

d) impregnating said preform with a polymerizable synthetic material;

e) curing said preform impregnated with said synthetic material; and f) machining said cured preform into the final state of said connecting-rod.

2. The method as claimed in claim 1, wherein said filling yarns of said reinforcement sheet which extend along said first direction comprise 0° direction filling yarns and wherein said filling yarns of said reinforcement sheet which do not extend along said first direction comprise 45°, 90° and 135° direction filling yarns.

3. The method as claimed in claim 2, wherein as many of said 0° direction filling yarns (4) are laid down as there are 45°, 90° and 135° direction filling yarns.

4. The method as claimed in claim 3, wherein for each series of superposed plies, the filling yarns are laid down according to the following sequence: said 0° direction yarns, said 45° direction yarns, said 0° direction yarns, said 90° direction yarns (5), said 0° direction yarns (4) and said 135° direction yarns.

5. The method as claimed in claim 3, wherein in step a) said additional filling yarns (5A) extend along the 90° direction.

* * * * *